(12) United States Patent
Fidh et al.

(10) Patent No.: US 11,014,432 B2
(45) Date of Patent: May 25, 2021

(54) VEHICLE VENT ASSEMBLY

(71) Applicant: Ford Global Technologies, LLC, Dearborn, MI (US)

(72) Inventors: Steven Nicholas Fidh, Ann Arbor, MI (US); Jennifer A. Herr-Rathke, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 16/054,617

(22) Filed: Aug. 3, 2018

(65) Prior Publication Data
US 2020/0039326 A1 Feb. 6, 2020

(51) Int. Cl.
*B60H 1/00* (2006.01)
*B60H 1/34* (2006.01)

(52) U.S. Cl.
CPC ....... *B60H 1/3414* (2013.01); *B60H 1/00028* (2013.01); *B60H 1/00871* (2013.01); *B60H 2001/3471* (2013.01); *B60H 2001/3492* (2013.01)

(58) Field of Classification Search
CPC .............. B60H 1/3414; B60H 1/00028; B60H 1/00871; B60H 2001/3471; B60H 2001/3492
USPC .......................................................... 454/69
See application file for complete search history.

(56) References Cited

U.S. PATENT DOCUMENTS

| | | | | |
|---|---|---|---|---|
| 4,416,192 A * | 11/1983 | Izumi | .................... | F24F 13/072 239/397 |
| 6,340,283 B1 | 1/2002 | Hedger et al. | | |
| 8,267,165 B2 * | 9/2012 | Nanaumi | ........... | B60H 1/00064 165/201 |
| 2003/0173056 A1 | 9/2003 | McCauley | | |
| 2006/0234621 A1 * | 10/2006 | Desrochers | ............. | F24F 3/044 454/239 |
| 2016/0039389 A1 * | 2/2016 | Kato | .................... | B60H 1/3414 454/127 |
| 2016/0152116 A1 * | 6/2016 | Albin | ................... | B60H 1/3421 454/155 |
| 2017/0100986 A1 * | 4/2017 | Shin | ................... | B60H 1/00057 |

(Continued)

FOREIGN PATENT DOCUMENTS

DE 102013111175 B3 * 9/2014 ............ F24F 13/081
DE 102016225128 A1 * 6/2018 ........... B60H 1/3414

(Continued)

OTHER PUBLICATIONS

Englesh translation of Abstract of the DE102013111175B3.*
English translation of DE102016225128A1 is USpatent document 20190270363.*

*Primary Examiner* — Helena Kosanovic
(74) *Attorney, Agent, or Firm* — David Coppiellie; Price Heneveld LLP

(57) ABSTRACT

A vehicle vent assembly includes a first flow channel selectively operating a primary airflow. A second flow channel selectively operates a first secondary airflow that exerts a first pressure on the primary airflow. A third flow channel selectively operates a second secondary airflow that exerts a second pressure on the primary airflow. The first and second secondary airflows control a direction of the primary airflow. The first pressure includes a positive or negative pressure, and the second pressure includes a respective negative or positive pressure.

12 Claims, 12 Drawing Sheets

(56) References Cited

U.S. PATENT DOCUMENTS

2017/0253107 A1   9/2017  Castiglioni et al.
2019/0270363 A1*  9/2019  Hoerschler .......... B60H 1/3414

FOREIGN PATENT DOCUMENTS

| JP | 1148552     | * | 10/1989 |
| JP | 2015081690 A |   | 4/2015  |

* cited by examiner

VEHICLE VENT ASSEMBLY

FIELD OF THE DISCLOSURE

The present disclosure generally relates to an air vent disposed within a passenger cabin of a vehicle, and more particularly, an air vent having multiple airstreams.

BACKGROUND OF THE DISCLOSURE

Automobiles typically include vents for delivering air into a passenger cabin of a vehicle, such as vents disposed on an instrument panel. These vents are typically adjustable to control airflow characteristics, so that a user can regulate the airflow as needed.

SUMMARY OF THE DISCLOSURE

According to one aspect of the present disclosure, a vehicle vent assembly includes a first flow channel selectively operating a primary airflow. A second flow channel selectively operates a first secondary airflow that exerts a first pressure on the primary airflow. A third flow channel selectively operates a second secondary airflow that exerts a second pressure on the primary airflow. The first and second secondary airflows control a direction of the primary airflow. The first pressure includes a positive or negative pressure, and the second pressure includes a respective negative or positive pressure.

Embodiments of the first aspect of the disclosure can include any one or a combination of the following features:
- a climate control system, wherein the first flow channel is coupled to the climate control system and the climate control system supplies the primary airflow;
- the second flow channel and the third flow channel are coupled to the climate control system and the climate control system supplies the first and second secondary airflows;
- the second flow channel and the third flow channel are coupled to one or more stand-alone airflow sources and the one or more stand-alone airflow sources supply the first and second secondary airflows;
- a first housing that defines the first flow channel;
- a second housing, wherein the first housing and the second housing define the second flow channel and the third flow channel;
- the second housing comprises at least a portion of an instrument panel;
- the first flow channel is in a substantially horizontal position, wherein the second flow channel is disposed above the first flow channel, wherein the third flow channel is disposed below the first flow channel, and wherein the first pressure comprises a positive pressure and the second pressure comprises a negative pressure;
- selectively operable vanes disposed within the first housing;
- a first perforated cover disposed over an opening in the second channel;
- a second perforated cover disposed over an opening in the third channel;
- the vent assembly is disposed in a substantially vertical position;
- one or more vent assemblies are disposed in one or more of the following locations: an instrument panel, a console, an A-pillar, a B-pillar, a ceiling, door trim, or other interior location;
- a controller in communication with the climate control system, wherein the controller is configured to receive an input indicative of a predetermined condition for activation of the climate control system; and
- activate the primary airflow, the first secondary airflow, and the second secondary airflow to generate an output in response to the input indicative of the predetermined condition for activation of the climate control system.

According to another aspect of the present disclosure, a temperature controlled ventilation system for a vehicle includes a vent assembly for delivering a predetermined airflow to a vehicle interior. The predetermined airflow includes a primary airflow, a first secondary airflow, and a second secondary airflow. A controller is configured to activate the vent assembly to deliver the predetermined airflow in response to a desired airflow.

Embodiments of the second aspect of the disclosure can include any one or a combination of the following features:
- the desired airflow comprises a straight airflow, a downward airflow, or an upward airflow;
- the vent assembly comprises one or more air movers for controlling the primary airflow, the first secondary airflow, and the second secondary airflow;
- the controller comprises a first controller disposed in a climate control system and wherein the first controller is configured to regulate the primary airflow; and
- the controller further comprises a second controller disposed in a stand-alone source and wherein the second controller is configured to regulate the first secondary airflow and the second secondary airflow.

According to a further aspect of the present disclosure, a vent assembly for a vehicle includes a first channel for delivering a primary airflow and second and third channels for delivering respective first and second secondary airflows. The primary airflow includes first and second portions having respective first and second directions. The second direction is defined by opposing first and second pressures exerted by the respective first and second secondary airflows on the primary airflow.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," "interior," "exterior," and derivatives thereof shall relate to the disclosure as oriented in FIGS. 1-12. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
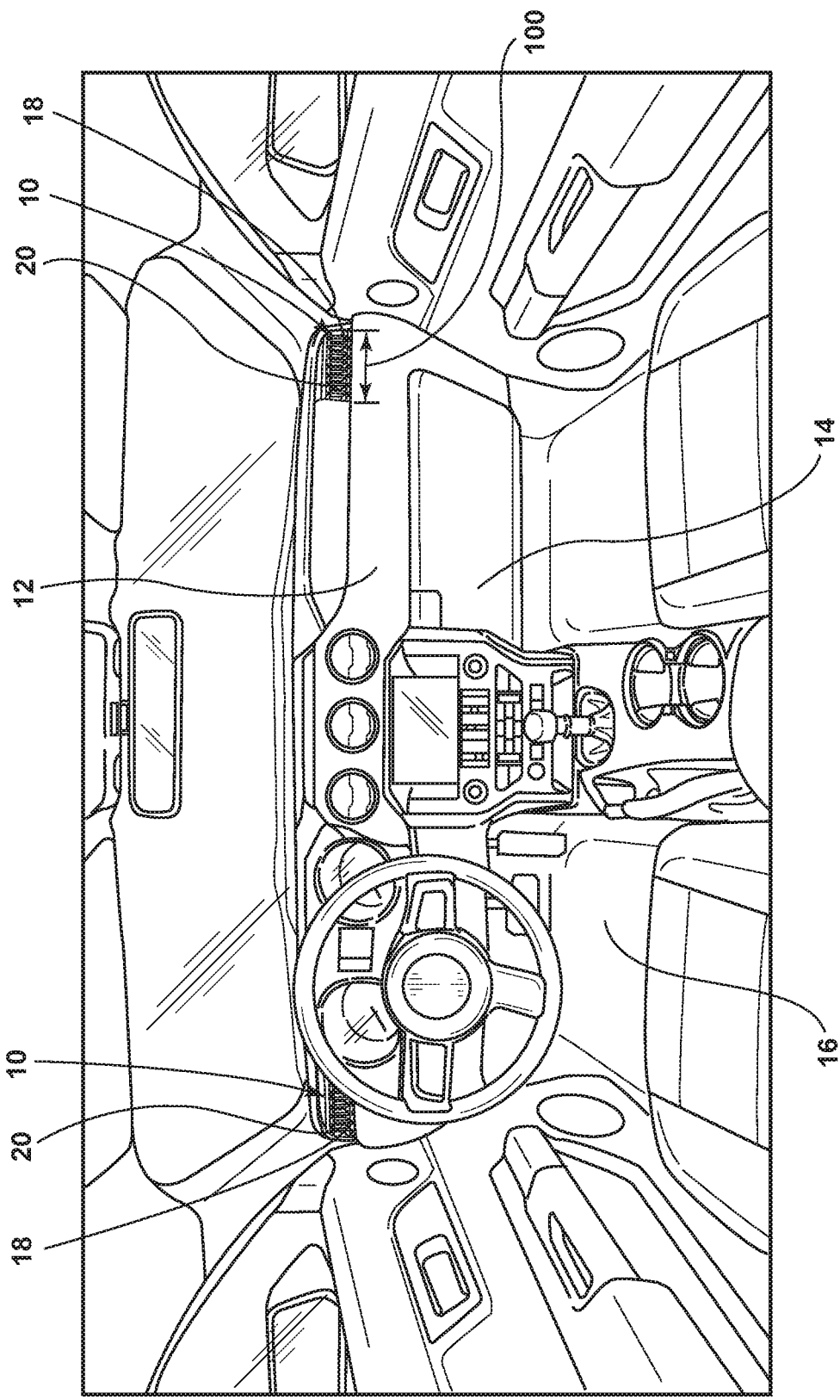
FIG. 1 is a perspective view of an interior of a passenger cabin of a vehicle showing vehicle vent assemblies.

Referring to FIG. 1, vent assemblies 10 are typically disposed within an instrument panel 12 set within a front area 14 of a vehicle cabin 16. According to various embodiments, the vent assemblies 10 are designed to have a compact, elongated opening 18 to conserve space in the vehicle instrument panel 12. The compact, elongated opening 18 of the vent assembly 10 saves space in the instrument panel 12 for packaging of display screens, airbags, and other components while maintaining a vertically slim, horizontally wide appearance of the instrument panel 12. To achieve the aforesaid styling and packaging design parameters, new ways of directing air into the cabin 16 are needed. As vertical openings for vent assemblies in the instrument panel become smaller, less space remains in vent assemblies for control knobs for mechanically regulating airflow direction. By way of example, in a typical vehicle, a passenger may selectively adjust the vent control knobs to mechanically position vent shutters disposed horizontally across a vent opening. The shutters are typically adjusted to direct airflow into the passenger cabin in a straight, upward, or downward direction. The vent control knobs may also position the vent shutters to block airflow into the cabin. As vent assemblies become vertically slimmer, there is also less space for the shutters in the vent assemblies. When shutters are arranged closely together in a vertically slim vent opening, pressure within the instrument panel and behind the shutters may increase and create unwanted NVH in the instrument panel. Further, long shutters disposed within vertically slim, horizontally elongated vent openings may be weak and flexible, and thus may convey an impression of poor quality. Accordingly, providing a vent assembly 10 in which secondary airflows 36, 40 direct a primary airflow 32 into a vehicle cabin 16, as generally set forth in FIGS. 1-12, thermally comforts a passenger while addressing instrument panel styling, packaging, and NVH design considerations.

Referring to FIGS. 1-12, a vehicle vent assembly 10 includes a first flow channel 30 selectively operating a primary airflow 32, a second flow channel 34 selectively operating a first secondary airflow 36 that exerts a first pressure on the primary airflow 32, and a third flow channel 38 selectively operating a second secondary airflow 40 that exerts a second pressure on the primary airflow 32. The first secondary airflow 36 and the second secondary airflow 40 control the direction of the primary airflow 32. The first pressure includes a positive or negative pressure, and the second pressure includes a respective negative or positive pressure.

Figure 2:
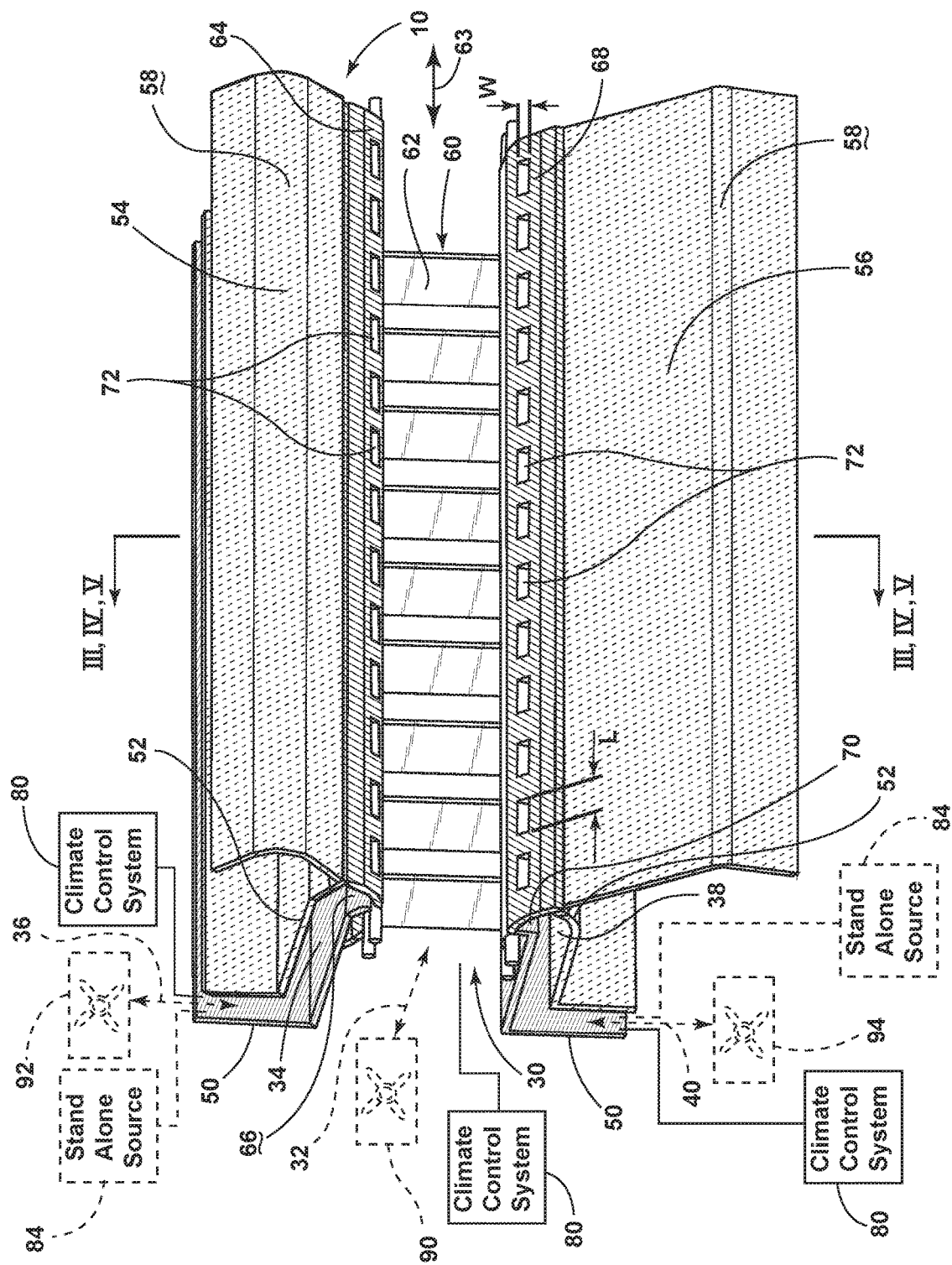
FIG. 2 is a forward perspective view of a portion of a vent assembly, according to an embodiment.
Figure 10:
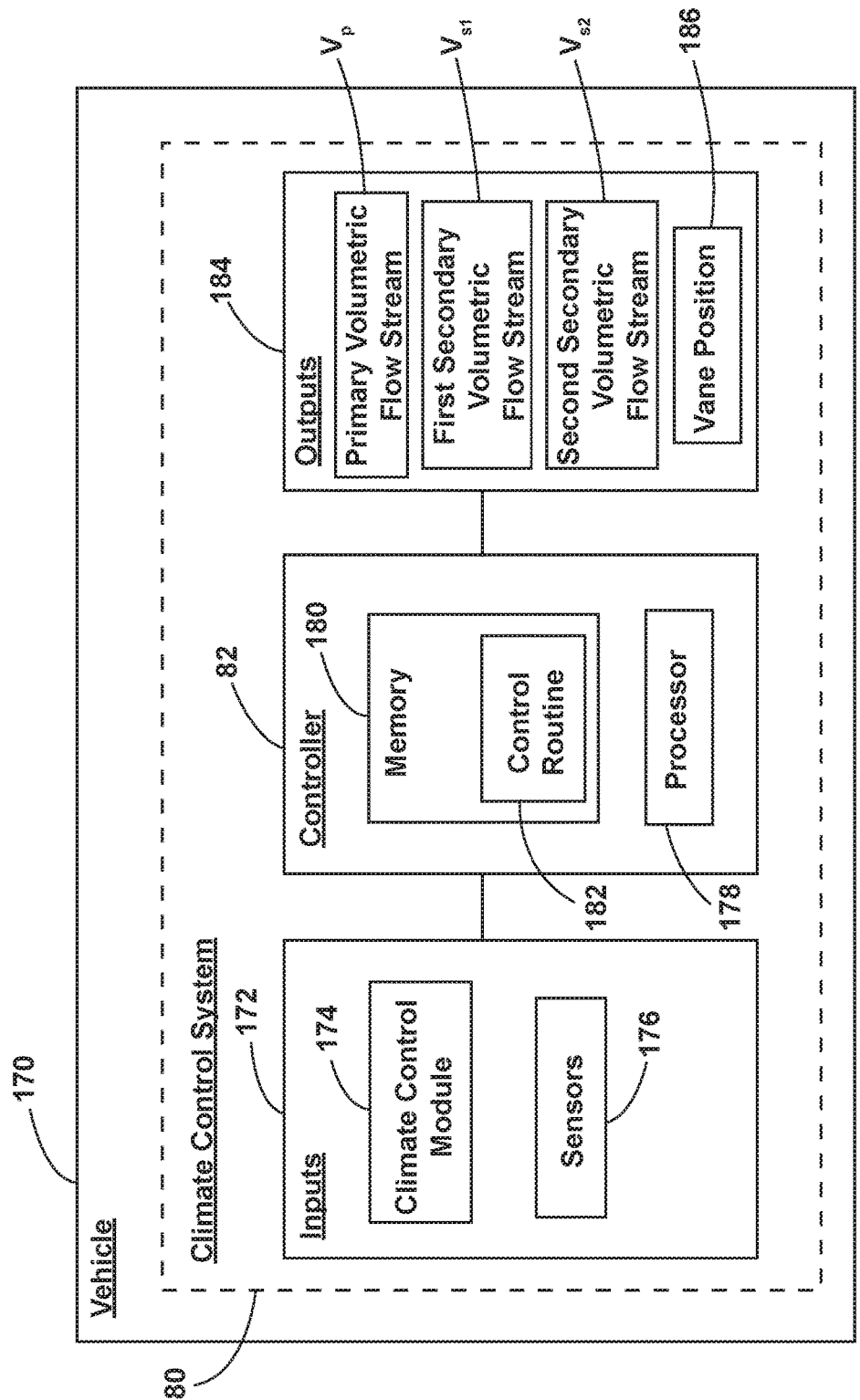
FIG. 10 is a schematic block diagram of the vehicle and the climate control system, according to an embodiment.
Figure 11:
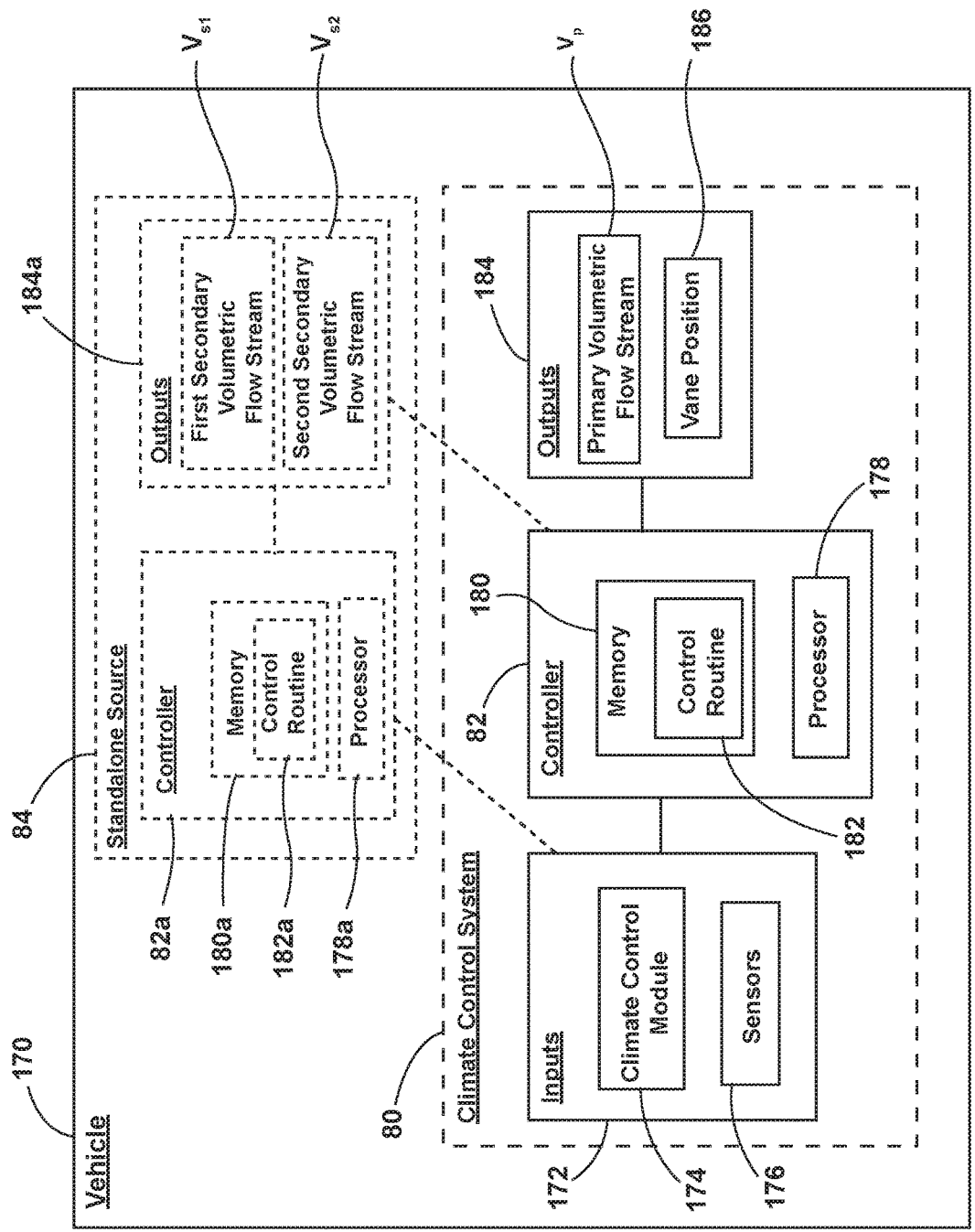
FIG. 11 is a schematic block diagram of a vehicle, a climate control system, and a stand-alone source, according to an embodiment.

Referring to FIG. 2, the vehicle vent assembly 10 includes a first flow channel 30 disposed between a second flow channel 34 and a third flow channel 38. In the depicted embodiment, a first housing 50 defines the first flow channel 30. A second housing 52 includes a first part 54 and a second part 56. In the depicted embodiment, the second housing 52 may be a portion of an instrument panel 12 (FIG. 1). A class A surface 58 that is visible to a passenger is disposed on the first part 54 and the second part 56 of the second housing 52. The second housing 52, together with the first housing 50, define the second flow channel 34 and the third flow channel 38. In the depicted embodiment, a set of selectively operable vanes 60 is disposed within the first housing 50. The selectively operable vanes 60 may be moved to control the horizontal direction shown by arrow 63 of the primary airflow 32. A first cover 64 is disposed over a cabin facing opening 66 in the second channel 34. A second cover 68 is disposed over a cabin facing opening 70 in the third flow channel 38. Perforations 72 in the first cover 64 and the second cover 68 have a length L and a width W. In one embodiment, the vent assembly 10 may be coupled to a climate control system 80 so that the first flow channel 30, the second flow channel 34, and the third flow channel 38 are coupled to the climate control system 80. In one example, the climate control system 80 may be a vehicle HVAC system. A controller 82 in the climate control system 80 may control the primary airflow 32 in the first flow channel 30, the first secondary airflow 36 in the second flow channel 34, and the second secondary airflow 40 in the third flow channel 38 (FIG. 10). In another embodiment, the first flow channel 30 may be coupled to the climate control system 80 while the second flow channel 34 and the third flow channel 38 are coupled to one or more stand-alone sources 84. A first controller 82 for controlling the primary airflow 32 may be located in the climate control system 80, and a controller 82 for controlling the first secondary airflow 36 and the second secondary airflow 40 may be located in the stand-alone source 84 (FIG. 11). Referring again to FIG. 2, one or more air movers 90, 92, 94 generate the primary airflow 32, the first secondary airflow 36, and the second secondary airflow 40. In the depicted embodiment, a first air mover 90 provides airflow to a first channel 30, a second air mover 92 provides airflow to a second channel 34, and a third air mover 94 provides airflow to a third channel 38.

Figure 3:
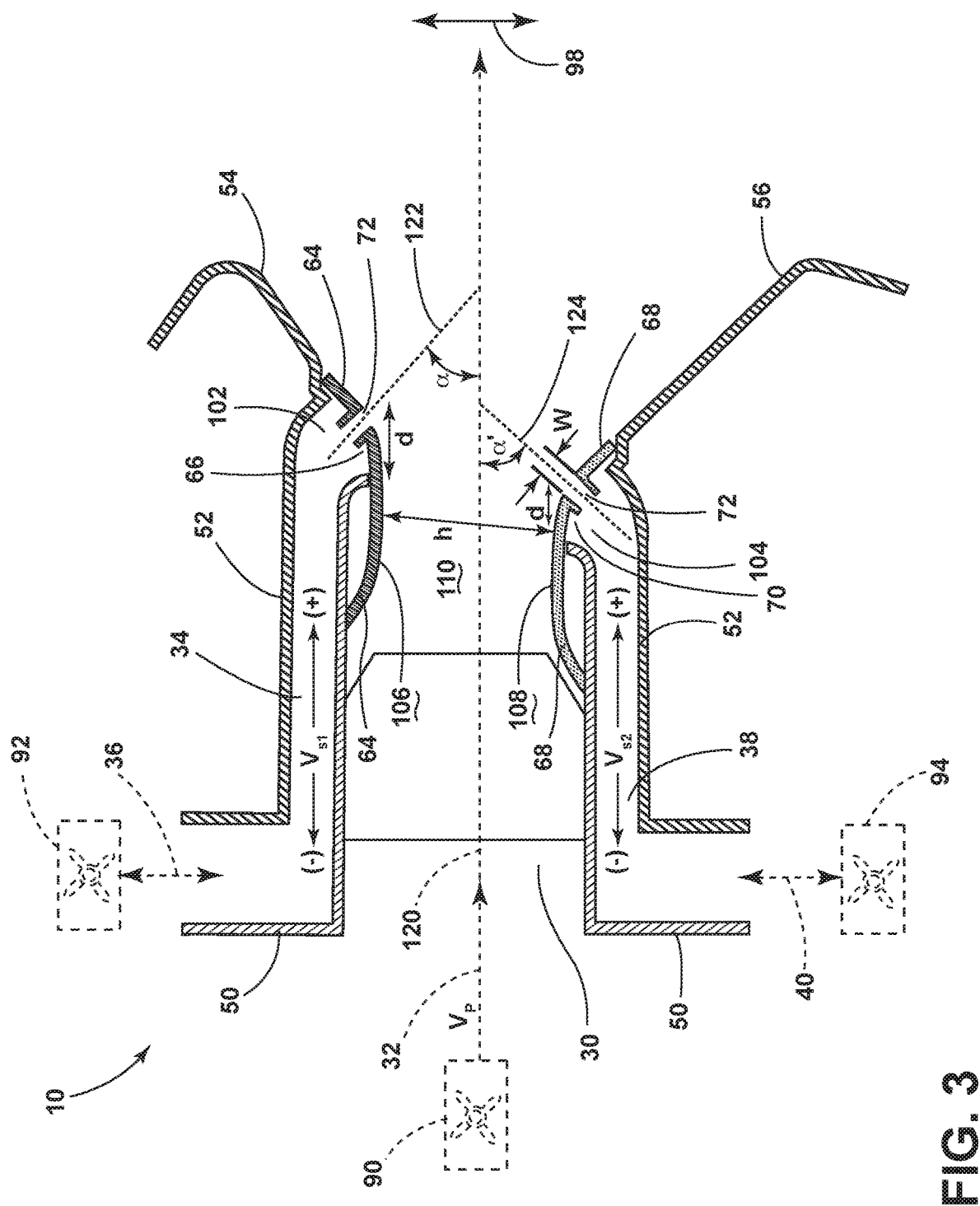
FIG. 3 is a schematic cross-sectional view of the vent assembly taken along line of FIG. 2, according to an embodiment.

Referring to FIG. 3, a schematic cross-sectional view taken along of FIG. 2 is shown. A vent assembly 10 configured to change the direction of a primary airflow 32 by using first and second secondary airflows 36, 40 is shown. In the depicted embodiment, the vent assembly 10 is positioned to change the vertical direction (shown by arrow 98) of a primary airflow 32. It is contemplated that in various other embodiments, the vent assembly may be positioned to change the primary airflow in a horizontal direction, a diagonal direction, and various other directions. For example, a vent assembly disposed vertically on an A-Pillar or a B-pillar may change the orientation of the primary airflow 32. The vent assembly 10 includes the first housing 50 and the second housing 52. The first housing 50 and the first part 54 of the second housing 52 form the second flow channel 34. The second channel 34 includes a cabin facing opening 70. A first cover 64 is disposed over the cabin facing opening 66. The first housing 50 and the second part 56 of the second housing 52 form the third flow channel 38. The third flow channel 38 includes a cabin facing opening 70. A second cover 68 is disposed over the cabin facing opening 70. The designation h indicates a distance between the first cover 64 and the second cover 68. The height h should be designed to accommodate a vent assembly 10 with a length 100 (FIG. 1) sufficient to enable a desired flow rate without an excessive pressure drop. The perforations 72 (FIGS. 2, 3) in the first cover 64 and the second cover 68 are proximate expansion areas 102, 104 of the respective second channel cabin facing opening 66 and the third channel cabin facing opening 70. Respective surfaces 106, 108 defining the cabin facing opening 110 with the height h are shaped to direct the primary airflow 32 towards the vehicle cabin 16 (FIG. 1). In one example, the intermediate distance h may be between 8 mm and 64 mm, and ideally between 16 and 32 mm. The corresponding length 100 of the opening of the first flow channel 30 (FIG. 1) should be sufficient to enable a desired flow rate without an excessive pressure drop. The perforations 72 may have a length L between 5 mm and 20 mm and ideally 10 mm, and a width W between 2 mm and 8 mm and ideally 4 mm. The angle α of the intersection of a first flow channel approximate center line 120 and an approximate center line 122 of the perforation 72 of the second flow channel 34 should be greater than 25 degrees and ideally greater than 50 degrees. Similarly, the angle $\alpha^1$ of the intersection of the first flow channel approximate center line 120 and an approximate center line 124 of the perforation of the third flow channel 38 should be greater than 25 degrees and ideally greater than 50 degrees.

Figure 4:
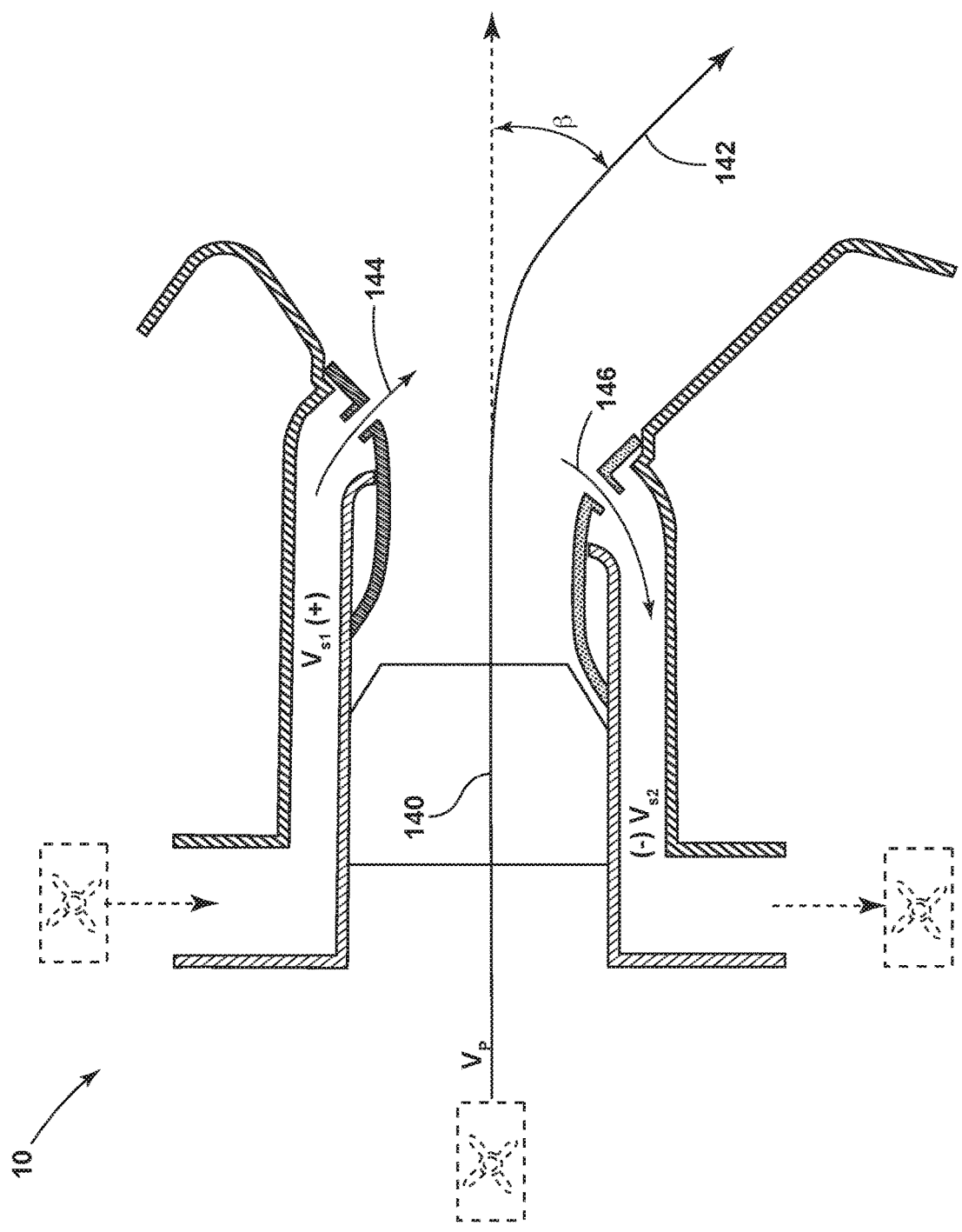
FIG. 4 is a schematic cross-sectional view of the vent assembly showing a downward angle of a primary volumetric flow stream taken along line IV-IV of FIG. 2, according to an embodiment.
Figure 5:
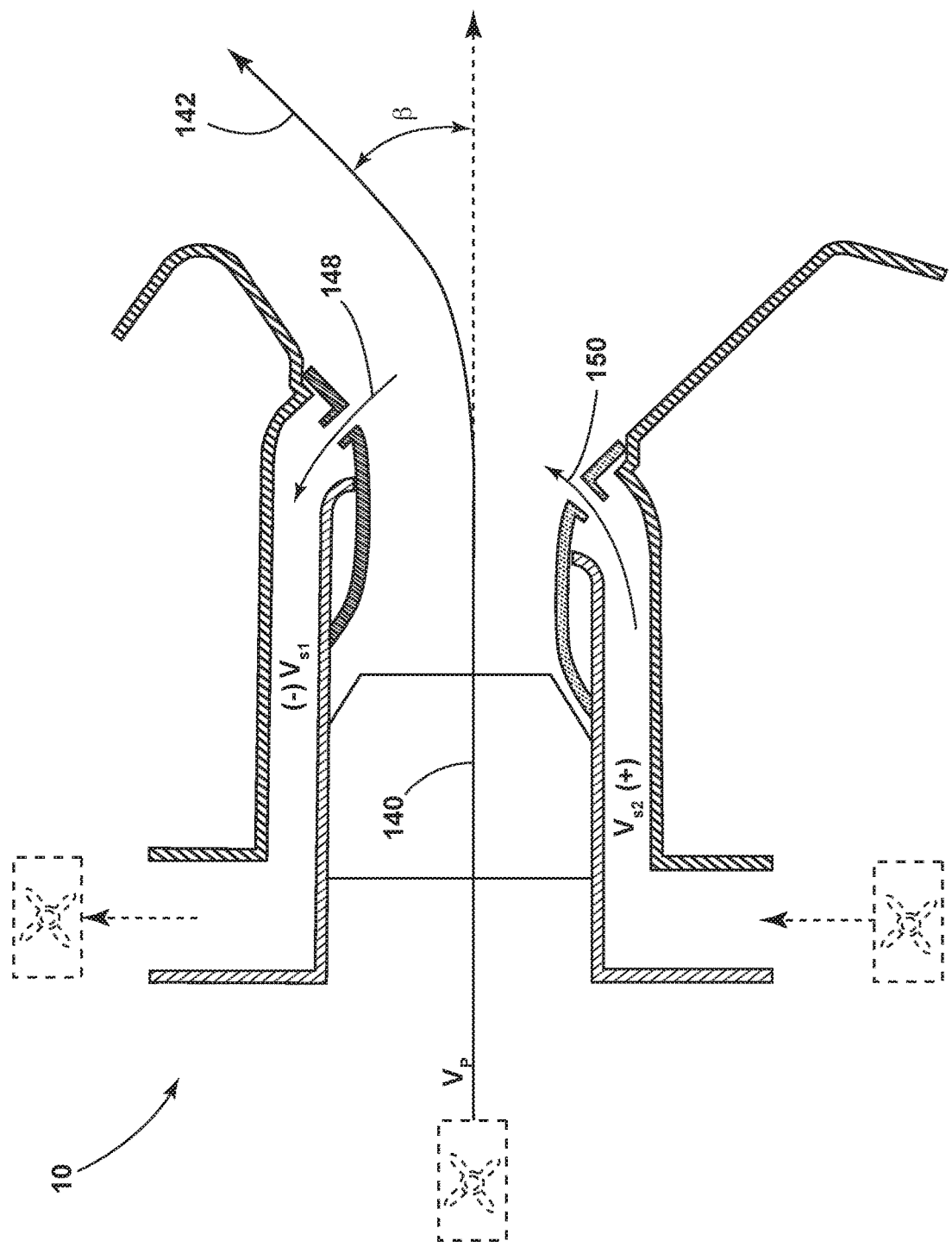
FIG. 5 is a schematic cross-sectional view of the vent assembly of FIG. 2 showing an upward angle of the primary volumetric flow stream taken along line V-V of FIG. 2, according to an embodiment.

Referring to FIGS. 3-11, the primary airflow 32 is shown as primary volumetric flow stream $V_p$, the first secondary airflow 36 is shown as the first secondary volumetric flow stream $V_{s1}$, and the second secondary airflow 40 is shown as the second secondary volumetric flow stream $V_{s2}$. FIG. 3 shows the primary volumetric flow stream $V_p$, the first secondary volumetric flow stream $V_{s1}$, and the second secondary volumetric flow stream $V_{s2}$. In various embodiments, the first secondary volumetric flow stream $V_{s1}$ could have a positive or negative flow, and the second secondary volumetric flow stream $V_{s2}$ could have a corresponding respective negative or positive flow. The pressure of the first secondary volumetric flow stream $V_{s1}$ is opposite the pressure of the second primary volumetric flow stream $V_{s2}$. Referring to FIG. 4, the primary volumetric flow stream $V_p$ includes a first portion 140 and a second portion 142. In one example, when the first secondary volumetric flow stream $V_{s1}$ has a positive pressure (shown by arrow 144), and the second secondary volumetric flow stream $V_{s2}$ has a negative pressure (shown by arrow 146), the second portion 142 of the primary volumetric flow stream $V_p$ will be directed downward (FIG. 4, angle β). Referring to FIG. 5, when the first secondary volumetric flow stream $V_{s1}$ has a negative pressure (shown by arrow 148), and the second secondary volumetric flow stream $V_{s2}$ has a positive pressure (shown by arrow 150), then the second portion 142 of the primary volumetric flow stream $V_p$ will be directed upwards (FIG. 5, angle β).

Figure 6:
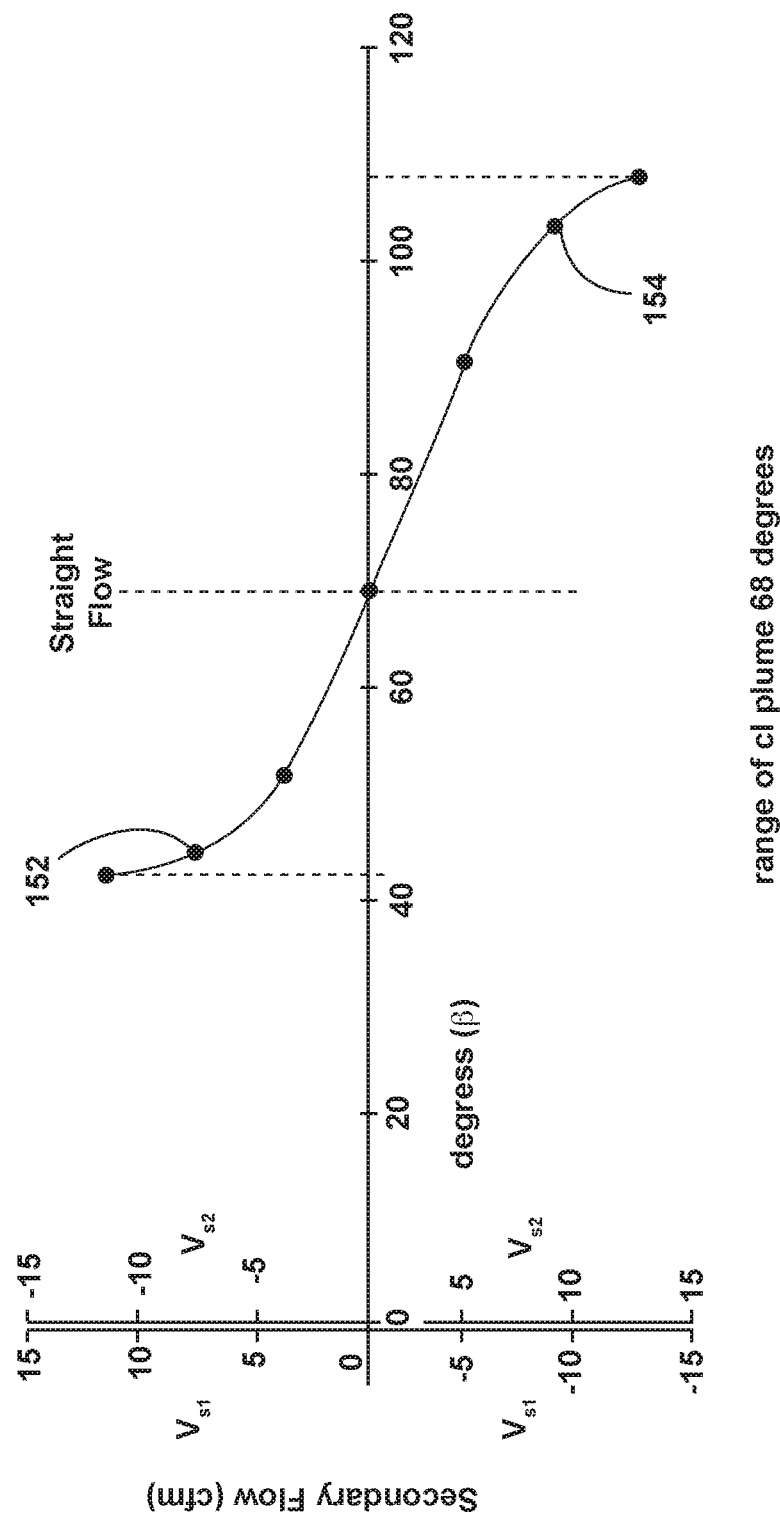
FIG. 6 is a chart showing the angle of the primary airflow along the X axis and the first secondary volumetric flow stream and the second secondary volumetric flow stream along the Y axis, according to an embodiment.
Figure 7:
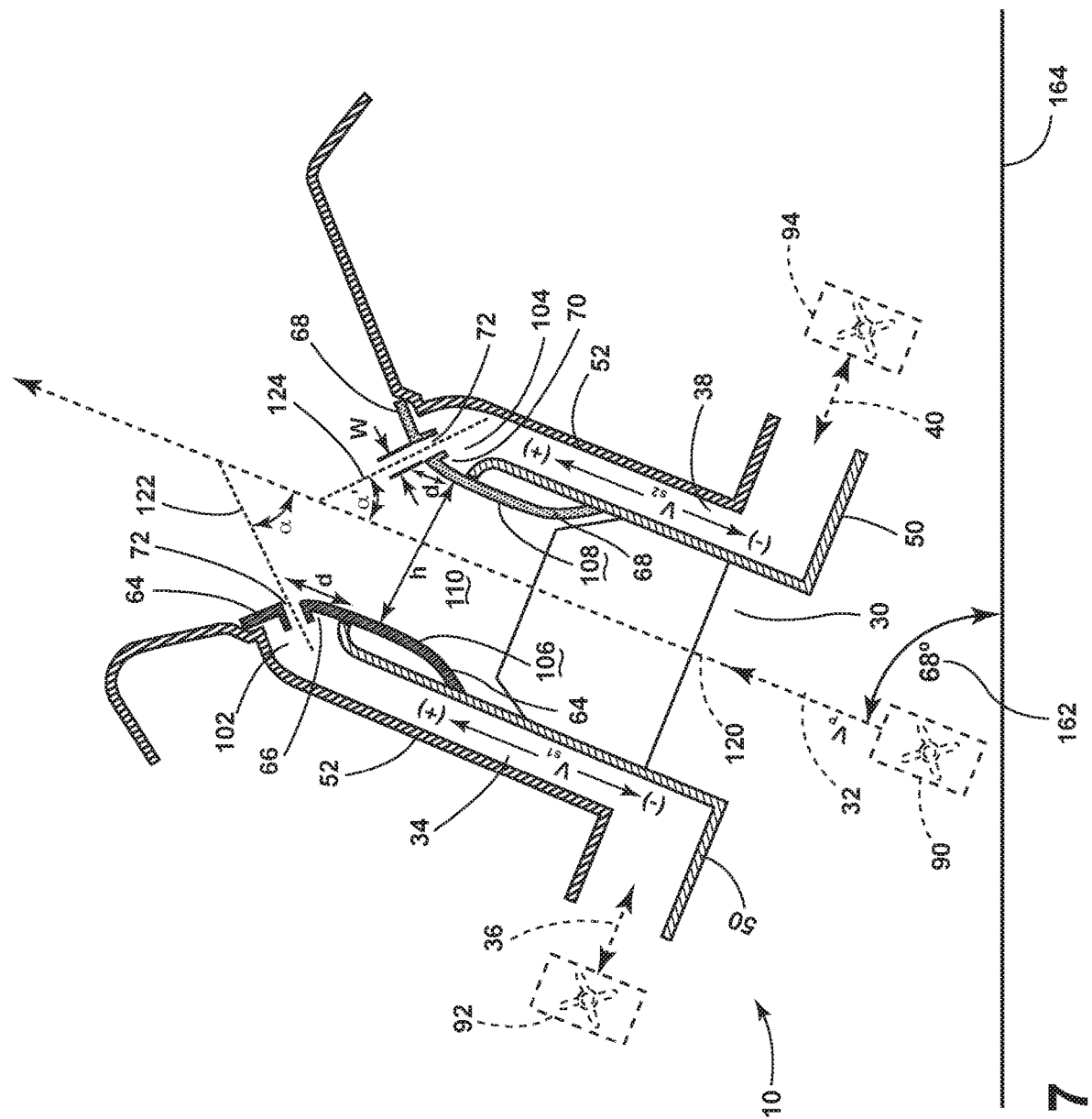
FIG. 7 is a schematic cross-sectional view of the vent assembly corresponding to the graph of FIG. 6, according to an embodiment.
Figure 8:
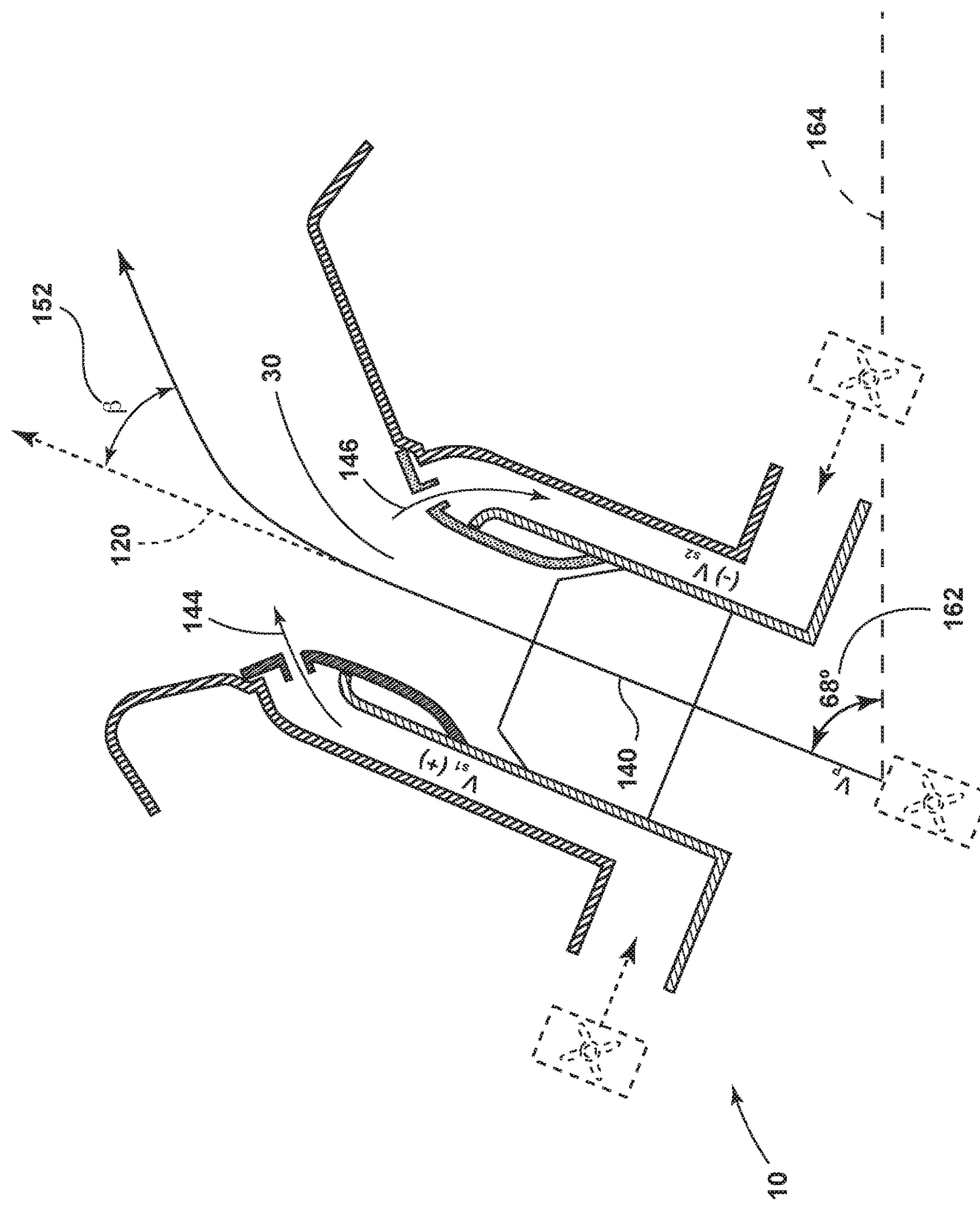
FIG. 8 is a schematic cross-sectional view of the vent assembly corresponding to the graph of FIG. 6 with a downward angle of the primary volumetric flow stream, according to an embodiment.
Figure 9:
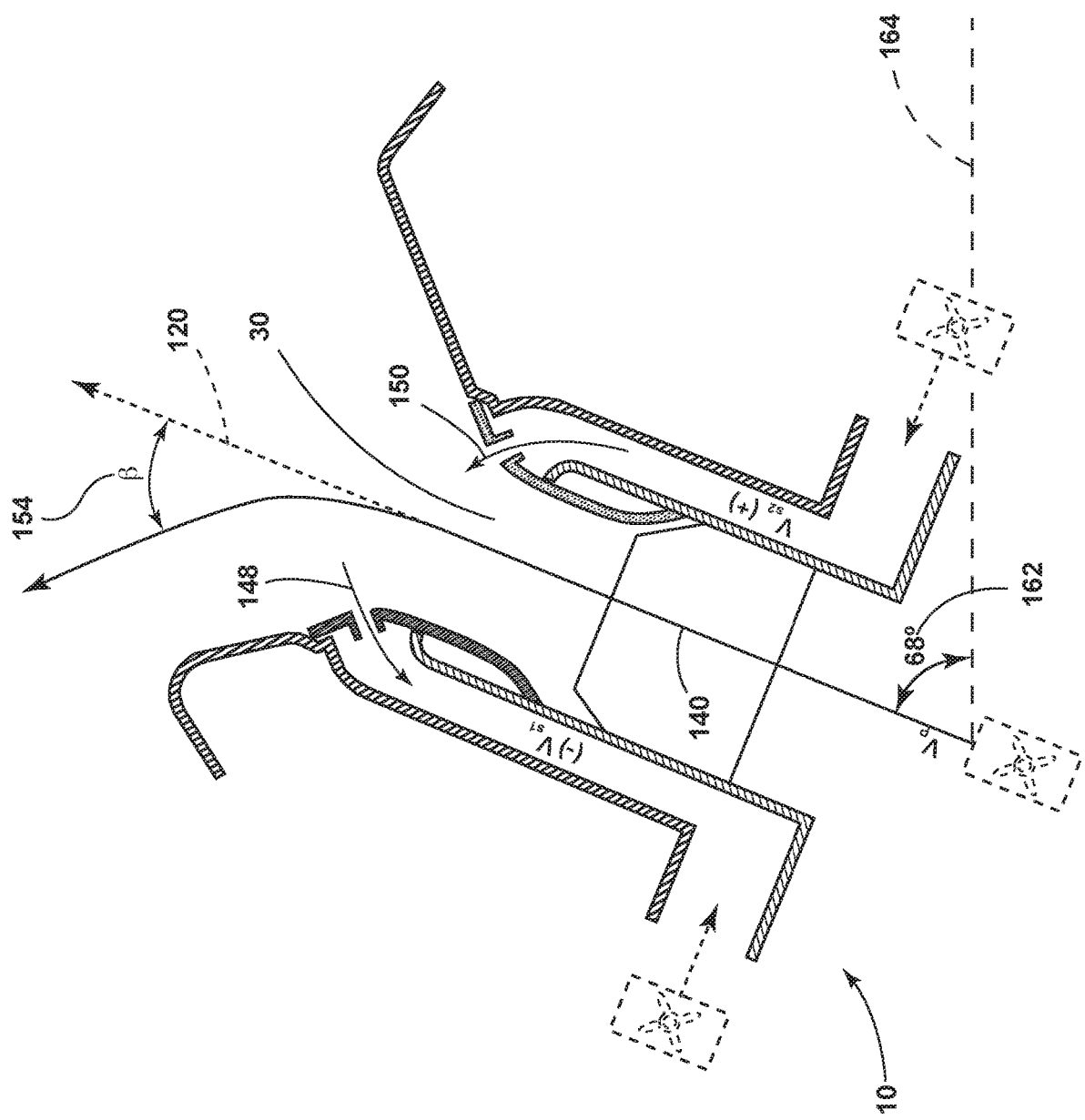
FIG. 9 is a schematic cross-sectional view of the vent assembly corresponding to the graph of FIG. 6 with an upward angle of the primary volumetric flow stream, according to an embodiment.

Referring to FIGS. 6-9, results of a test conducted on the vent assembly 10 oriented in a position where the primary volumetric flow stream $V_p$ and the vent assembly 10 are placed at a 68 degree angle (element 162) from a horizontal line 164 are shown. FIG. 6 is a graph entitled "Physical Test Data Primary Flow 30 cfm." The angle β of the primary volumetric flow stream $V_p$ is plotted on the X axis and the first secondary volumetric flow stream $V_{s1}$ and the second secondary volumetric flow stream $V_{s2}$ are plotted on the Y axis. The X axis includes units of "degrees (β)." The Y axis includes units of "Secondary Flow (cfm)." The bottom caption states "range of cl plume 68 degrees" and refers to the plot of degrees (β) of the primary volumetric flow stream $V_p$ at the various first secondary volumetric flow stream $V_{s1}$ and second secondary volumetric flow stream $V_{s2}$ values plotted along the Y axis. A downward angle β (element 152 in FIGS. 6, 8) results when the first secondary volumetric flow stream $V_{s1}$ is positive and the second secondary volumetric flow stream $V_{s2}$ is negative. Arrow 152 shows the downward angle β plotted on the graph (FIG. 6). An upward angle β (element 154 on FIGS. 6, 9) results when the first secondary volumetric flow stream $V_{s1}$ is negative and the second secondary volumetric flow stream $V_{s2}$ is positive. Arrow 154 shows the upward angle β plotted on the graph (FIG. 6). In one example, the primary flow stream $V_p$ ranges between an upward angle β and a downward angle β for a total of approximately 60 degrees. That is, in the embodiment of the vent assembly 10 shown in FIGS. 6-9, in one example, the vent assembly 10 can typically direct the primary volumetric flow stream $V_p$ at angles β of up to 30 degrees in each direction (downwards from the first flow channel approximate center line 120, as shown in FIG. 8, and upwards from the first flow channel approximate center line 120, as shown in FIG. 9).

With reference again to FIG. 6, in various embodiments of the disclosure, the primary volumetric flow stream $V_p$ may be varied from 13 to 33 l/s. The first and second secondary volumetric flow streams $V_{s1}$ an $V_{s2}$ may be varied from 0 to 5.5 l/s.

In various embodiments, based on variations in the profile of the instrument panel 12, the pressures of the first secondary volumetric flow stream $V_{s1}$ and the second volumetric flow stream $V_{s2}$ may be adjusted accordingly. For example, in one embodiment, uneven opposite volumetric flow streams (i.e., the first secondary volumetric flow stream $V_{s1}$ and the second volumetric flow stream $V_{s2}$) could have values of 4 l/s and −6 l/s.

Referring now to FIG. 10, a vehicle 170 includes a climate control system 80. The block diagram of the vehicle 170 is shown including the climate control system 80. In the depicted embodiment, the inputs 172 include two actuators: the climate control module 174 and sensors 176. The inputs 172 are in communication with the controller 82. The controller 82 may include a processor 178 and a memory 180 for executing a control routine 182. The memory 180 may also include stored routines or stored information (e.g., related to the volumetric flow rates of the primary volumetric flow stream $V_p$, the first secondary volumetric flow stream $V_{s1}$, and the second secondary volumetric flow stream $V_{s2}$, and vane positions 186). In the depicted embodiment, the memory 180 of the controller 82 includes the control routine 182. In various embodiments, the controller 82 is a stand-alone device that is not in communication with body control modules, electronic control modules, engine control modules, and/or other features of the vehicle 170. In various embodiments, the controller 82 can be any type of control circuitry. For example, the controller 82 could be a switch on a wire. In the depicted embodiment, the controller 82 is in communication with one or more inputs 172 that may be used in conjunction with the controller 82 and may communicate with the controller 82 through a multiplex communication bus (e.g., LIN, CAN, etc.). The controller 82 may selectively activate one or more outputs 184 including the primary volumetric flow stream $V_p$, the first secondary volumetric flow stream $V_{s1}$, the second secondary volumetric flow stream $V_{s2}$, and the vane position 186.

Referring to FIG. 11, another embodiment including the vehicle climate control system 80 is shown. In the embodiment of FIG. 11, a climate control system 80 regulates the primary volumetric flow stream $V_p$ and the vane position 186. A stand-alone source 84 regulates the first secondary volumetric flow stream $V_{s1}$ and the second secondary volumetric flow stream $V_{s2}$. A controller 82 is disposed in the climate control system 80 for regulating the primary flow stream $V_p$ and the vane position 186. A second controller 82a is disposed in the stand-alone source 84 for regulating the first secondary volumetric flow stream $V_{s1}$ and the second secondary volumetric flow stream $V_{s2}$.

Figure 12:
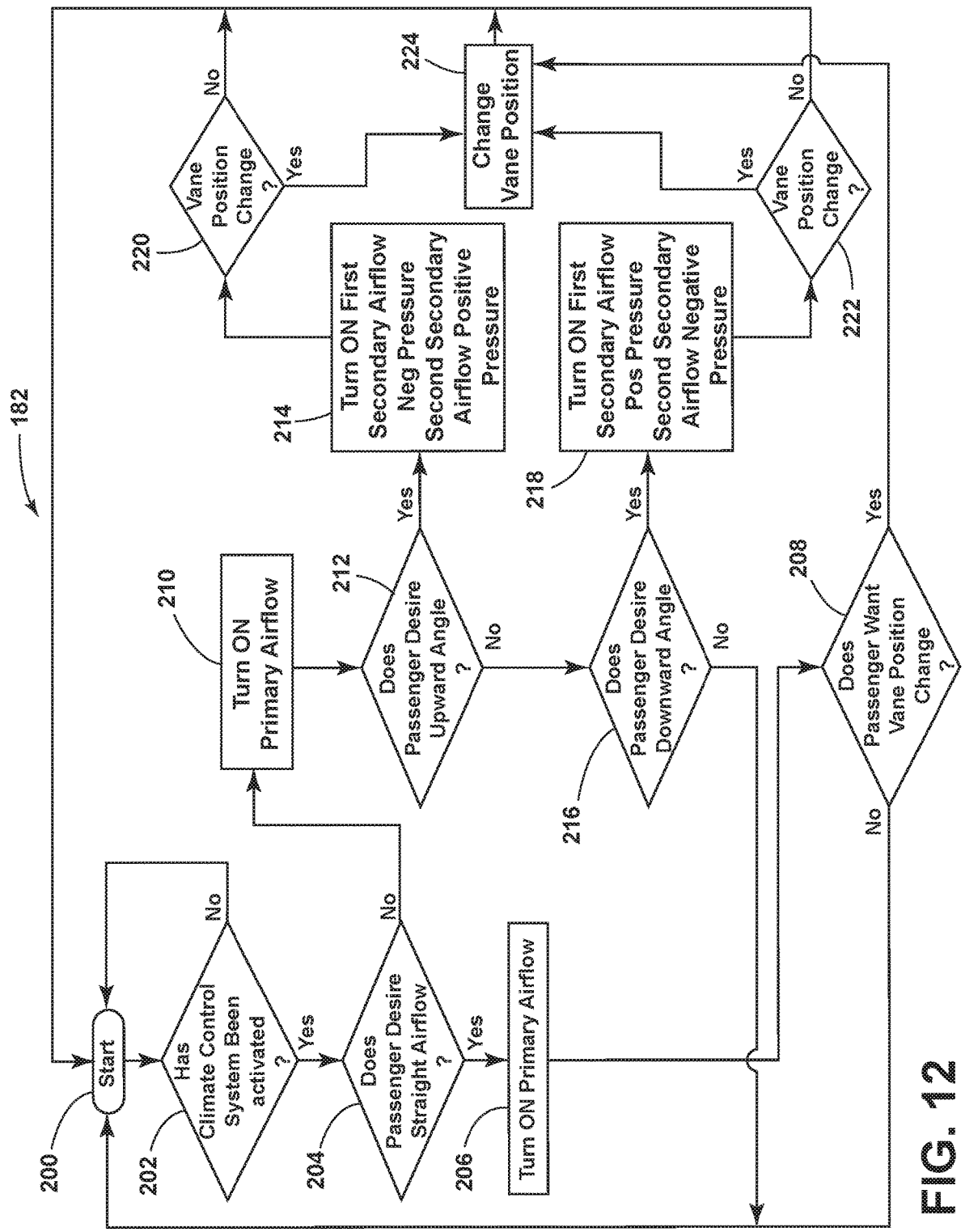
FIG. 12 is a flow chart of a control routine for dictating the direction of a primary volumetric flow stream, according to an embodiment.

Referring to FIG. 12, an embodiment of the control routine 182 for controlling the direction of the primary volumetric flow stream $V_p$ is shown. The control routine 182 may begin at step 200 when the first steps are taken to determine the climate control system 80 status. From step 200, the control routine 182 proceeds to decision step 202. At decision step 202, if the climate control system has been activated, then the control routine 182 proceeds to decision step 204. Decision step 204 is where the determination is made of whether the passenger desires straight airflow. If the passenger desires straight airflow, then the primary volumetric flow stream $V_p$ is turned on at step 206. The passenger is next asked whether a vane position change is desired at step 208. If a vane position change is desired at step 208, then the change vane position step 224 is taken. Returning to step 204, if the passenger does not desire straight airflow, then the first secondary volumetric flow stream $V_{s1}$ is turned on at step 210. Decision step 212 asks if the customer desires an upward angle. If the customer does desire an upward angle, then the first secondary volumetric flow stream $V_{s1}$ is turned on with negative pressure and the second secondary volumetric flow stream $V_{s2}$ is turned on with positive pressure at step 214. If the customer does not desire an upward angle at step 212, then at step 216 the question is asked whether the customer desires a downward angle. If the customer desires a downward angle, then the action step 218 relating to turning on the first secondary volumetric flow stream $V_{s1}$ at positive pressure and turning on the second secondary volumetric flow stream $V_{s2}$ at negative pressure is taken. After steps 214, 218, the control routine 182 proceeds to steps 220, 222. At steps 220, 222 the question is asked whether the vane position should be changed. If the vane position should be changed, then the control routine 182 proceeds to step 224 and the vane position is changed. If the answers to the questions about changing vane positions at steps 220, 222 are negative, then the control routine 182 returns to the initial step 200.

In various embodiments, vent assemblies may be disposed at other locations within the vehicle (for example, a console, an A-pillar, a B-pillar, a ceiling, door trim, or other interior location) in addition to or instead of the instrument panel.

In various embodiments, the overall shape, appearance, and position of the vent assembly 10 can be modified to match the appearance and contours of the instrument panel 12.

A variety of advantages may be derived from use of the present disclosure. The NVH concerns that may arise from use of conventional long slender vent openings and shutters which may deflect easily during operation have been addressed. The potential for creating unwanted NVH in the instrument panel and vent assembly area has been reduced by creating positive and negative pressure on each side of the primary flow. A visually pleasing, simple design of the vent assembly complements the instrument panel.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the components of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, components shown as integrally formed may be constructed of multiple parts, or elements shown as multiple parts may be integrally formed, the length or width of the structures may be varied, and the nature or number of adjustment positions provided between the components may be varied. It should be noted that the components may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle vent assembly comprising:
a first flow channel defined by a first housing, the first flow channel selectively operating a primary airflow defining a first approximate centerline;
a second flow channel defined by the first housing and a first part of the second housing and including a second approximate centerline, the second flow channel selectively operating a first secondary airflow including a first linear arrangement of airflow portions directed along the second approximate centerline defined by a perforated member that exerts a first pressure on the primary airflow; and
a third flow channel defined by the first housing and a second part of the second housing and including a third approximate centerline, the third flow channel selectively operating a second secondary airflow including a second linear arrangement of airflow portions directed along a third approximate centerline defined by the perforated member that exerts a second pressure on the primary airflow, wherein the first and second secondary airflows control a direction of the primary airflow, wherein the first pressure comprises a positive or a negative pressure and the second pressure comprises a respective negative or a respective positive pressure, wherein the second approximate centerline intersects the first approximate centerline at a first angle, wherein the third approximate centerline intersects the first approximate centerline at a second angle, wherein an intersection of the second approximate centerline and the first approximate centerline and an intersection of the third approximate centerline and the first approximate centerline are disposed at different locations along a segment of the first approximate centerline surrounded by the second housing.

2. The vehicle vent assembly of claim 1, further comprising:
a climate control system, wherein the first flow channel is coupled to the climate control system and the climate control system supplies the primary airflow.

3. The vehicle vent assembly of claim 2, wherein the second flow channel and the third flow channel are coupled to the climate control system and the climate control system supplies the first and second secondary airflows.

4. The vehicle vent assembly of claim 1, wherein the first part of the second housing defines a cabin-facing surface of an instrument panel and wherein the second part of the second housing defines a cabin-facing surface of the instrument panel.

5. The vehicle vent assembly of claim 4, wherein the first flow channel is in a substantially horizontal position, wherein the second flow channel is disposed above the first flow channel, wherein the third flow channel is disposed below the first flow channel, and wherein the first pressure comprises a positive pressure and the second pressure comprises a negative pressure.

6. The vehicle vent assembly of claim 5, further comprising:
selectively operable vanes disposed within the first housing.

7. The vehicle vent assembly of claim 1, wherein the perforated member includes a first cover extending along the inside of the first channel and including perforations that define the first linear arrangement of airflow portions disposed over a cabin-facing opening in the second channel and a second cover extending along the inside of the first channel and including perforations that define the second linear arrangement of airflow portions disposed over a cabin-facing opening in the third channel.

8. The vehicle vent assembly of claim 1, wherein the vent assembly is disposed in a substantially vertical position.

9. The vehicle vent assembly of claim 2, wherein one or more vent assemblies are disposed in one or more of the following locations: an instrument panel, a console, an A-pillar, a B-pillar, a ceiling, door trim, or other interior location.

10. The vehicle vent assembly of claim 3, further comprising:
a controller in communication with the climate control system, wherein the controller is configured to:
receive an input indicative of a predetermined condition for activation of the climate control system; and
activate the primary airflow, the first secondary airflow, and the second secondary airflow to generate an output in response to the input indicative of the predetermined condition for activation of the climate control system.

11. The vehicle vent assembly of claim 1, wherein the perforated member includes a cover including a single line of perforations disposed over an expansion area of the second channel and a single line of perforations disposed over an expansion area of the third channel.

12. The vehicle vent assembly of claim 1, wherein the perforated member includes perforations, wherein each perforation includes a length and a width, and wherein the length of each perforation is greater than the width of each perforation, and wherein the perforated member extends along an interior of the first channel and is positioned adjacent to a vane assembly disposed in the first channel.

* * * * *